United States Patent [19]

Lofstrom

[11] Patent Number: 5,170,684
[45] Date of Patent: Dec. 15, 1992

[54] CORE CUTTER DEVICE

[76] Inventor: Roger J. Lofstrom, 151 S. Ridgedale Ave., East Hanover, N.J. 07936

[21] Appl. No.: 845,526

[22] Filed: Mar. 4, 1992

Related U.S. Application Data

[63] Continuation of Ser. No. 621,253, Nov. 30, 1990, abandoned.

[51] Int. Cl.⁵ .............................................. B23B 3/04
[52] U.S. Cl. ........................................ 82/70.1; 82/93; 82/101
[58] Field of Search ................... 82/46, 53.1, 70.1, 78, 82/47, 48, 101, 92, 93, 94, 95, 96, 97, 72; 242/55.2; 83/54, 187, 195

[56] References Cited

U.S. PATENT DOCUMENTS

| | | | |
|---|---|---|---|
| 3,158,074 | 11/1964 | Brigham | 82/53.1 |
| 3,304,819 | 2/1967 | Pasternack | 82/53.1 |
| 3,323,399 | 6/1967 | Gerstein | 82/101 |
| 3,772,945 | 11/1973 | Varga | 82/70.2 |
| 3,776,070 | 12/1973 | Stoffels | 82/52 |
| 3,817,137 | 6/1974 | Thatcher | 83/444 |
| 3,861,252 | 1/1975 | Stoffels et al. | 82/40 |
| 3,911,768 | 11/1975 | Kawano | 82/86 |
| 3,955,455 | 5/1976 | Guzman | 83/409 |
| 4,072,073 | 2/1978 | Birkestrand | 82/70.1 |
| 4,138,911 | 2/1979 | Namiguchi | 82/72 |
| 4,152,958 | 5/1979 | Bogert | 82/47 |
| 4,172,399 | 10/1979 | Hillesheimer | 82/46 |
| 4,205,573 | 6/1980 | D'Angelo et al. | 83/733 |
| 4,292,867 | 10/1981 | Stoffels et al. | 82/101 X |
| 4,381,083 | 4/1983 | Tsunetsuga | 242/55.2 |
| 4,476,453 | 10/1984 | Hollweck | 337/361 |
| 4,517,867 | 5/1985 | Fuminier | 82/101 |
| 4,591,405 | 5/1986 | Languillat | 82/53.1 |
| 4,649,780 | 3/1987 | Takeuchi et al. | 82/48 |
| 4,744,277 | 5/1988 | Balint | 83/54 |
| 4,930,379 | 6/1990 | Takaniemi | 82/101 |

Primary Examiner—Larry I. Schwartz
Assistant Examiner—Julie R. Daulton
Attorney, Agent, or Firm—Kane, Dalsimer, Sullivan, Kurucz, Levy, Eisele and Richard

[57] ABSTRACT

A device for separating a cardboard tube into cores for winding strips of material includes a mandrel mounted for rotation on a frame. A carriage reciprocates in parallel with a mandrel and may be positioned very precisely to cut cores of preselected axial width from the tube mounted on the mandrel. A blade pivots on the carriage for performing the actual cutting operation.

11 Claims, 7 Drawing Sheets

CORE CUTTER DEVICE

This is a continuation of copending application Ser. No. 07/621,253 filed on Nov. 30, 1990, now abandoned.

BACKGROUND OF THE INVENTION

A. Field of Invention

This invention pertains to a device for cutting tubular or ring shaped cores of elongated tube material made for example of cardboard and the like, and more particularly to a cutter device which can be used to make cores of preselected axial lengths very precisely and automatically.

B. Description of the Prior Art

Cores of the type described above are used for winding very long and relatively thin materials such as metal bands and the like. Frequently this winding operation, especially for metal bands, is performed automatically by placing several such cores on rotating mandrels at the end of a slitter. A long, relatively wide metal sheet is fed into the slitter which then automatically slits the sheet into a large number of bands, each metal band being wound simultaneously on one of the cores. However in order for this operation to be performed satisfactorily, the cores must be cut accurately in the axial direction.

Core cutters are known in the art in which a tube is rotated with this distal end positioned adjacent to a stop. A knife is then used to cut off a core after which the tube is shifted axially until it again contacts the stop. However this type of device does not produce cores with the required accuracy. Moreover the whole operating is slow because after each cutting step, the new core may be removed by hand, and the tube must then be repositioned.

OBJECTIVES AND SUMMARY OF THE INVENTION

In view of the above disadvantages of the prior art, an objective of the present invention is to provide a core cutter device which can produce accurate cores.

A further objective is to provide a device which can be operated swiftly and efficiently.

Yet another objective is to provide a relatively inexpensive device which can produce several cores without the necessity of unloading.

Other objectives and advantages of this invention shall become apparent from the following description. A core cutting device constructed in accordance with this invention includes a mandrel rotatably mounted on a support means. The mandrel cooperates with a chuck to hold and rotate a cardboard tube disposed on the mandrel. The device also includes a cutting means reciprocating along a path parallel to the axis of rotation of the mandrel. The cutting means is manually pivotable between a cutting position for cutting the tube into cores of precise axial dimensions, and an inoperative position. The cutting means is precisely positioned along the path by an electronic control circuit.

DETAILED DESCRIPTION OF THE PREFERRED EMBODIMENT

Figure 2:
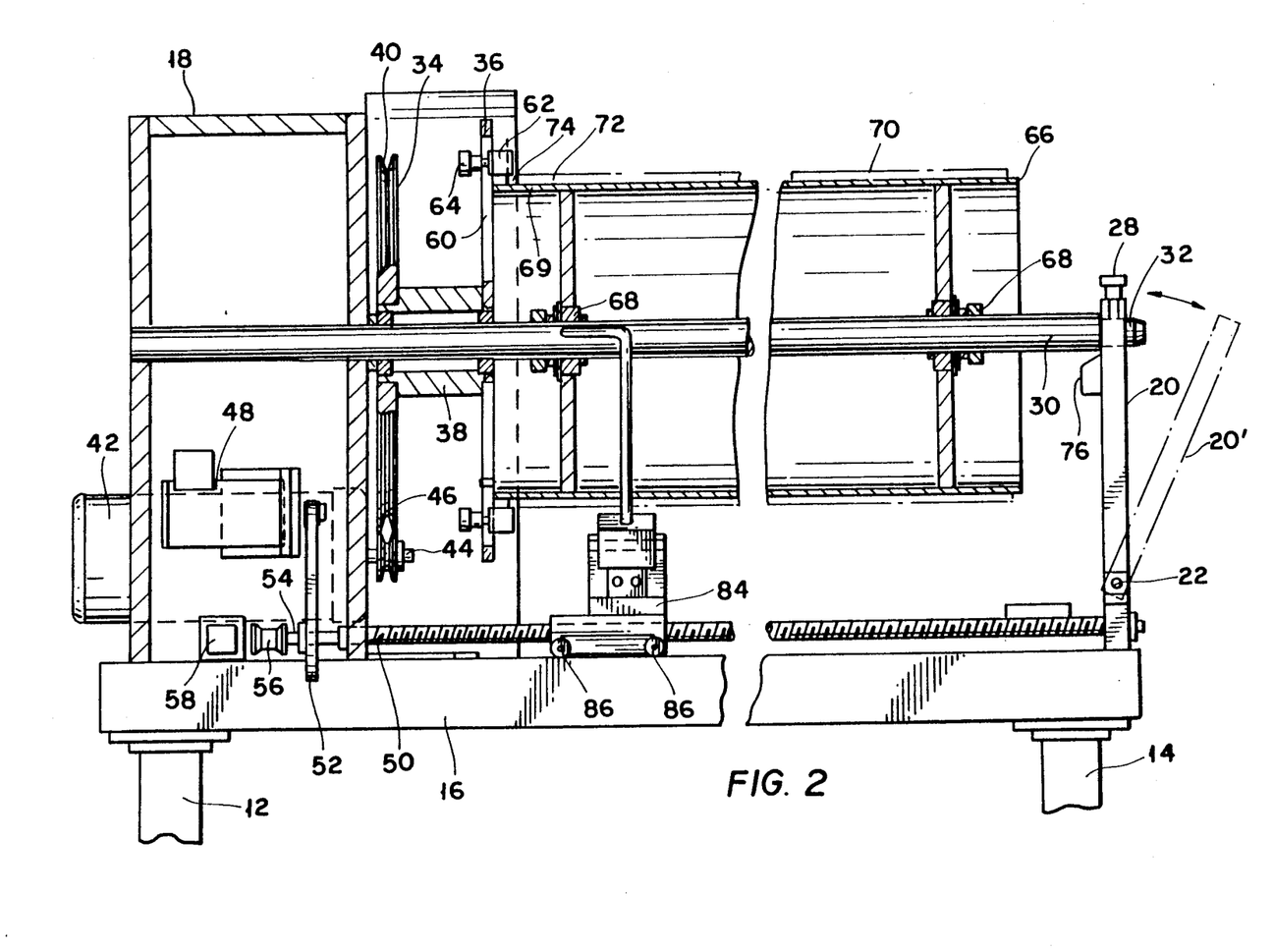
FIG. 2 shows a front view with the apparatus with the control panel removed.

Referring now to the figures, a core cutter device 10 constructed in accordance with this invention comprises a support structure consisting of a pair of upright legs 12, 14 supporting a flat table 16. As seen in FIG. 2, on the right side of the table 16 there is a rectangular fixed frame 18. On the left side of the table 16 there is an upright member 20 which has a bottom hinge 22. Hinge 22 allows the member 20 to pivot around a horizontal axis. On top, member 20 has a semicircular hole 24 and a catch 26 closed by a nut 28 (See FIG. 4). Extending between the fixed frame 18 and upright member 20 is a shaft 30. End 32 of shaft 30 rests in hole 24 and releasable secured to member 20 by catch 26.

Preferably shaft 30 is fixed and rotatably mounted thereon is a wheel 34 and a chuck 36 coupled to each other by a sleeve 38. Wheel 34 has a circumferential V-shaped groove 40. Frame 18 holds a first motor 42 with a shaft 44. A belt 46 engages shaft 44 and is disposed in groove 40.

Also mounted on frame 18 is a second motor 48. This motor is coupled to a threaded lead screw 50 by a second belt 52 to drive the lead screw. Lead screw 50 is substantially coextensive with shaft 30. On one end 54, lead screw 50 is provided with an angular encoder 56. Facing encoder 56 is a position detector 58 used to sense very precisely the angular position and rotation of the lead screw 50 by monitoring the angular encoder 56. Alternatively motor 48 could be a stepping motor directly coupled to lead screw 50 and arranged so that for each step of the motor, the lead screw turns one way or another by a predetermined angle. In this latter arrangement the angular encoder 56 and position detector 58 are unnecessary.

Chuck 36 is provided with a plurality of radial slots 60. Within each slot there is sliding a tooth 62 which can slide radially. Each tooth 62 may be secured at a radial position within its slot 60 by a nut 64.

Figure 4:
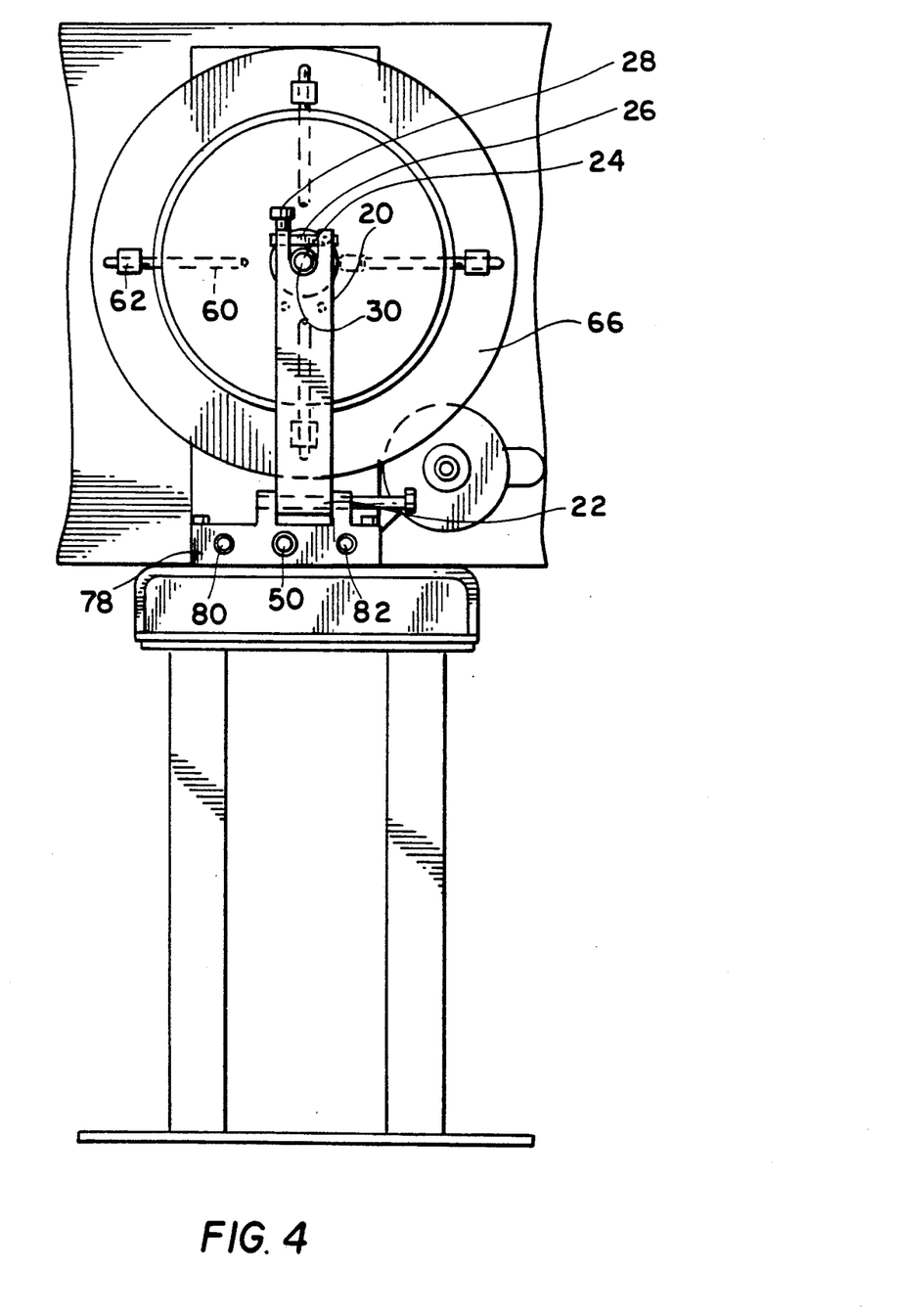
FIG. 4 shows a right side view of the device of FIG. 1.

Also, mounted on shaft 30 there is cylindrical mandrel 66. The mandrel is rotatably supported on the shaft by bearings 68. The mandrel has one end 69 which is dogged into the chuck 36. The outer diameter of the mandrel is equal in size to the inner diameter of the core to be cut, as described more fully below. The cutter device 10 is supplied with several mandrels 66 having different outer diameters. In order to change a mandrel, the teeth 62 are loosened and moved radially outward to disengage from the mandrel 66. Nut 28 is then opened and catch 26 is pivoted upward. The upright member 20 is then pivoted clockwise to disengage from the end 32 of shaft 30, as shown in dotted lines at 20' (FIG. 4). With upright member 26 pivoted away from shaft 30, the mandrel 66 can be slipped off the shaft 30 and replaced by another mandrel having a larger or smaller diameter as desired.

Disposed coaxially around mandrel 88 is a tube 70 made of paper, cardboard, or other material suitable for a core. Tube 70 is installed on the mandrel 66 also by pivoting member 20 away from shaft 30 as described above. Preferably at its inner end 72, cuts 74 are made in the tube 70 so that the tube registers with the teeth 62. As the mandrel is rotated, the tube rotates with the mandrel without slippage.

It has been found that for relatively long mandrels, when the member 20 is pivoted away from shaft 30, the shaft has a tendency to droop down because of the weight of the mandrel. In order to facilitate the installation of the shaft back to the normal position, a member with an inclined surface is provided on member 20. This inclined surface is shaped and arranged so that as member 20 is pivoted counterclockwise back from position 20', near its final position, surface 76 comes into contact with the end 32 of shaft 30 and acts as a camming surface to push it upwards toward the position shown in FIG. 2.

Base 78 disposed between member 20 and table 16 supports the distal end of lead screw 50, as shown in FIGS. 2 and 4. On the two sides of the lead screw, the subject device is also provided with two parallel rigid rods 80, 82. As seen more clearly in FIG. 1, rods 80, 82 are coextensive with lead screw 50.

Figure 5:
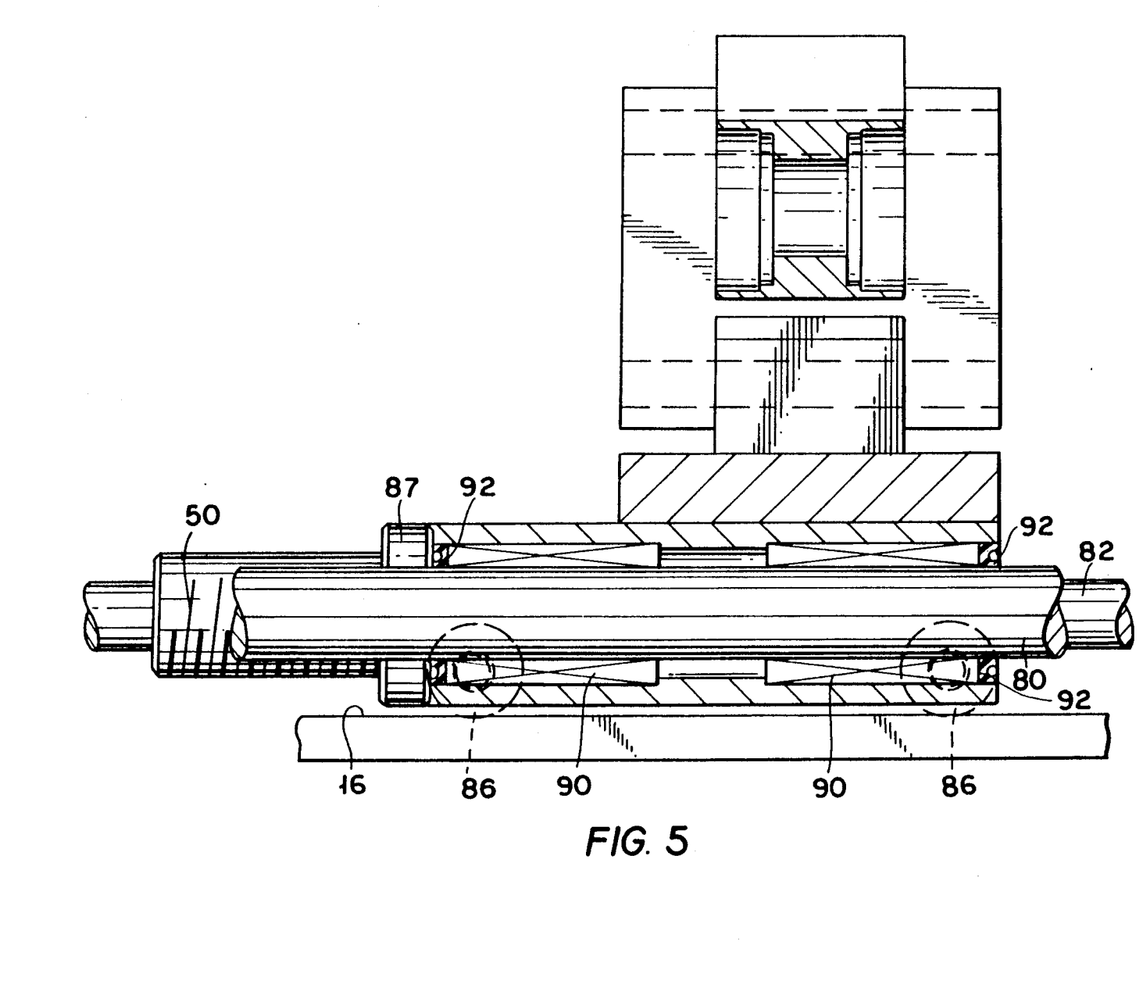
FIG. 5 shows a side-sectional view of the carriage for the device of FIG. 1.
Figure 6:
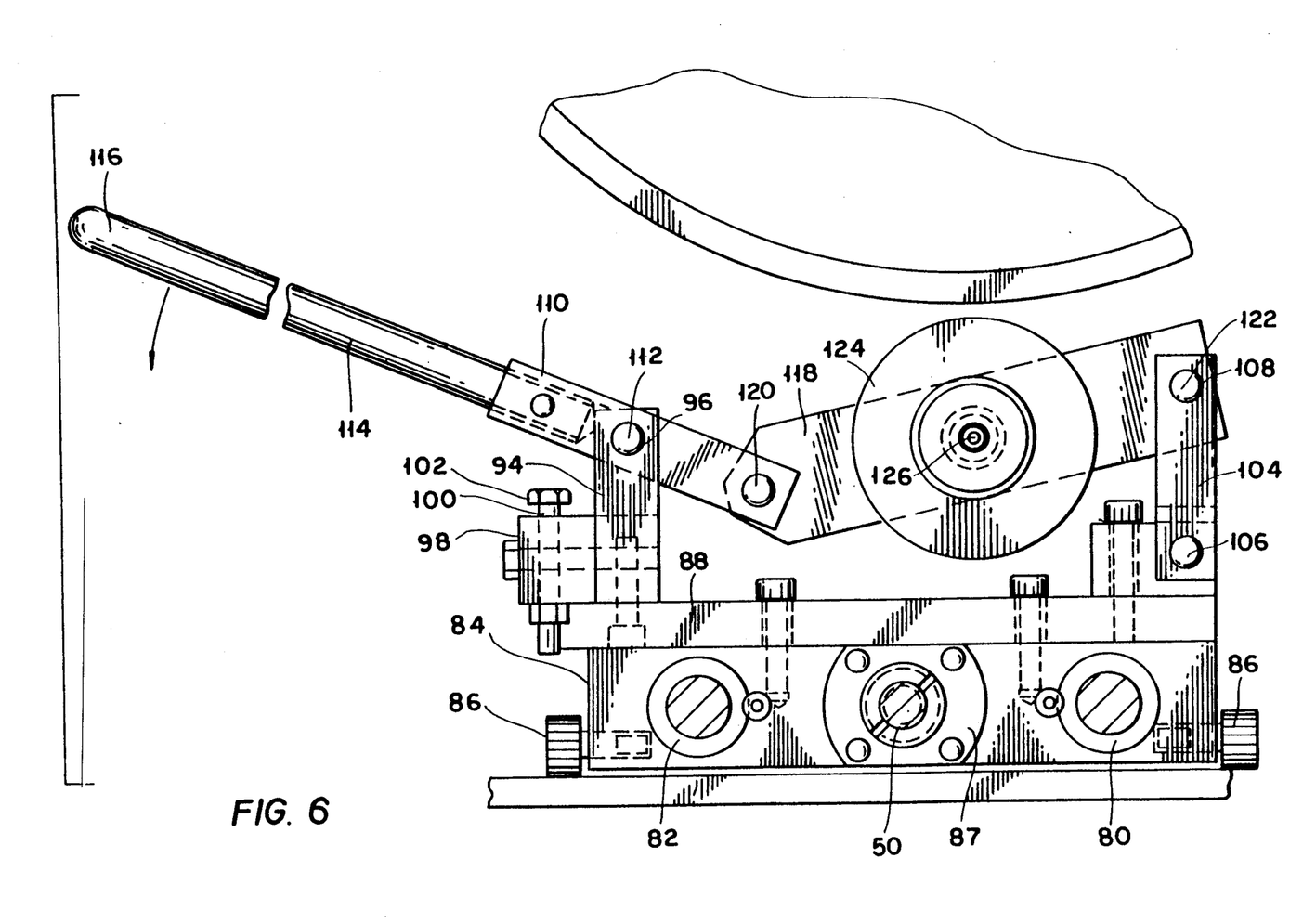
FIG. 6 shows an end view of the cutting assembly of the device of FIG. 1 in the inoperative position.

Also provided on the table 16 is a carriage 84 shown in detail in FIGS. 5 and 6. This carriage 84 is provided with a number of wheels 86 which support the carriage 84. On one side, the carriage 84 is provided with a threaded member 87 which in engagement with the threads on lead screw 50.

Carriage 84 also has a platform 88. Under the platform there are four bushings 90 engaging rods 80, 82. The rods 80, 82, bushings 90, lead screw 50 and threaded member 87 cooperate so that as the lead screw is turned, the carriage, guided by the rods 80, 82 moves along the table 16. The bushings 90 and threaded member 87 are dimensioned and positioned so that the weight of the carriage 84 and the forces generated during the cutting operation (discussed more fully below) are transmitted directly to the table 16, and not the lead screw 50 or rods 80, 82. Seals 92 are provided to keep dirt away from the bushings 90 and the lead screw 50.

Platform 88 supports a rigid upright member 94 terminating in a hole 96 (See FIG. 4). Mounted on upright 94 is a side extension 98 holding a vertically reciprocating screw 100. Screw 100 has a screw head 102.

On the other side of the platform 88, there is another upright 104 which pivots around a horizontal pin 106. Upright 104 has a hole 108 disposed at its upper end.

Figure 1:
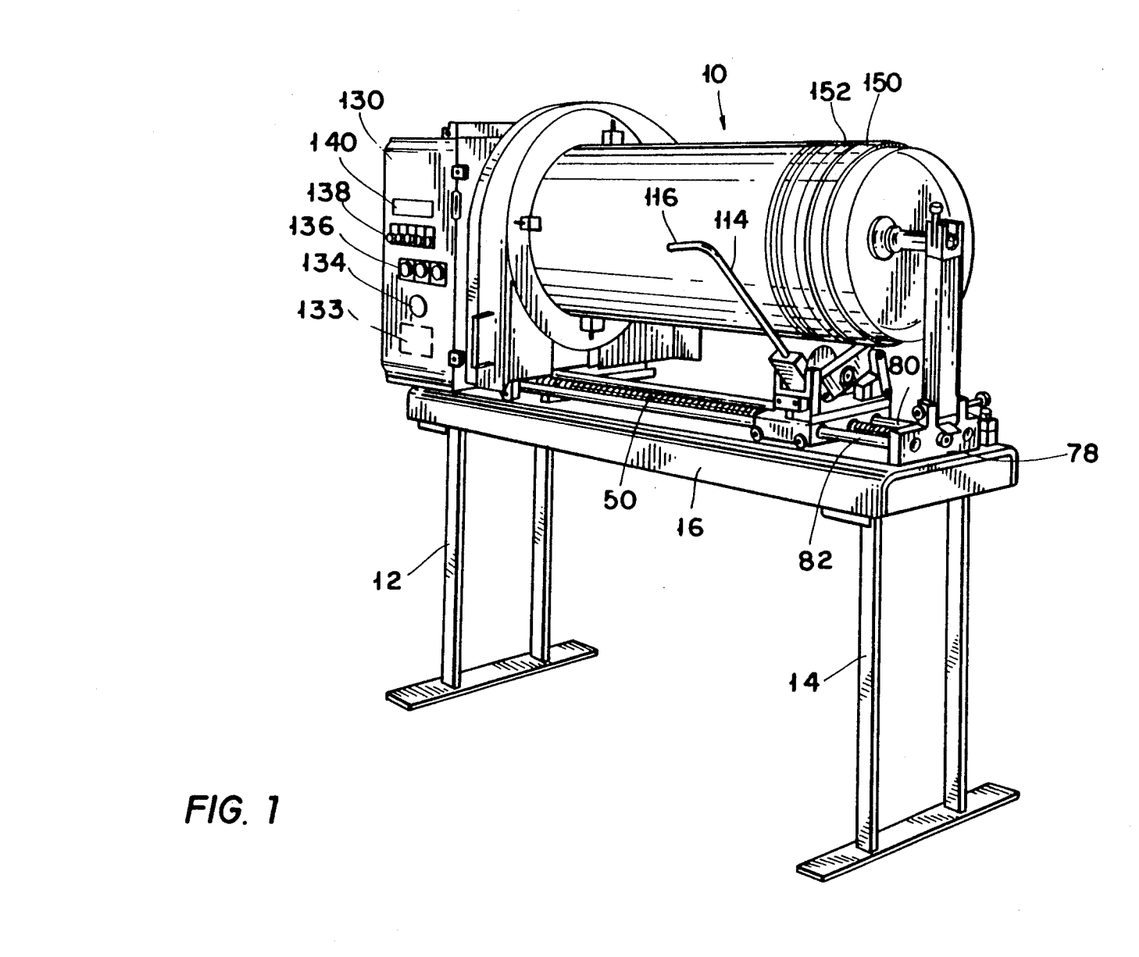
FIG. 1 shows an orthogonal view of a core cutter device constructed in accordance with this invention.
Figure 7:
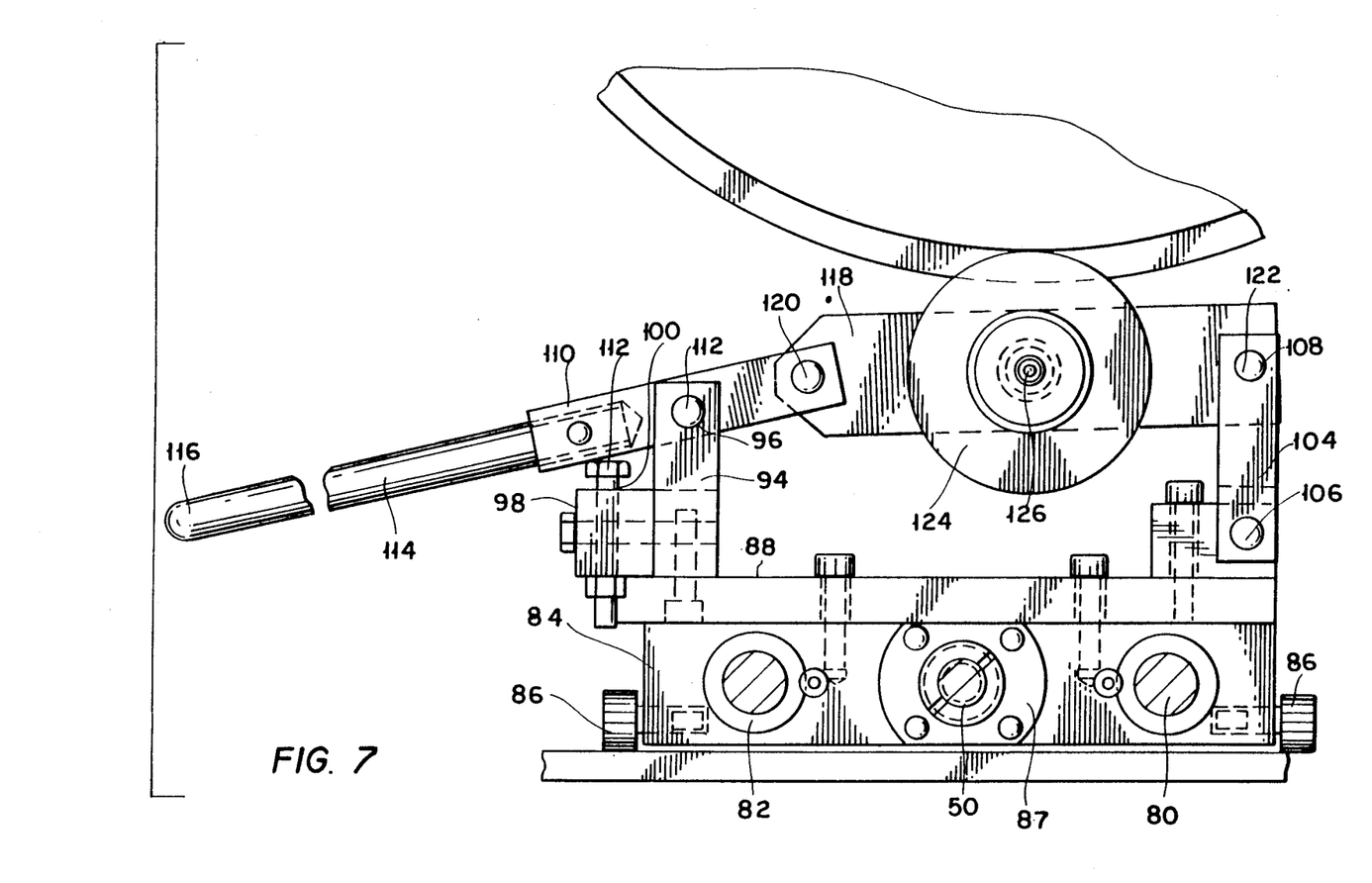
FIG. 7 shows a view of the cutting assembly of FIG. 6 in the operative position.

Mounted on uprights 94, 104 there is a cutting member including block 110 pivoted by a pin 112 through hole 96. An arm 114 extends outwardly form the block 110 and its end is bent at an angle of 90° to form a handle 116 as shown in FIG. 1. Opposite arm 114, block 110 engages one end of a cross-member 118 through a pivoting pin 120. The other side of cross-member 118 is pivotally connected to upright 104 by a pin 122 passing though hole 108. Cross member supports a rotary cutting blade 124 rotatable around a horizontal pin 126. Block 110, upright 104 and cross-member 118 cooperate so that as arm 114 is manually pivoted downward by an operator through handle 116, the blade 124 is brought generally upward to contact and cut tube 70, as shown in FIG. 7. Thread head 102 is positioned to act as a stop for arm 114 to insure that the blade 124 does not contact the mandrel 66, so that neither the mandrel nor the blade 124 are damaged.

Figure 3:
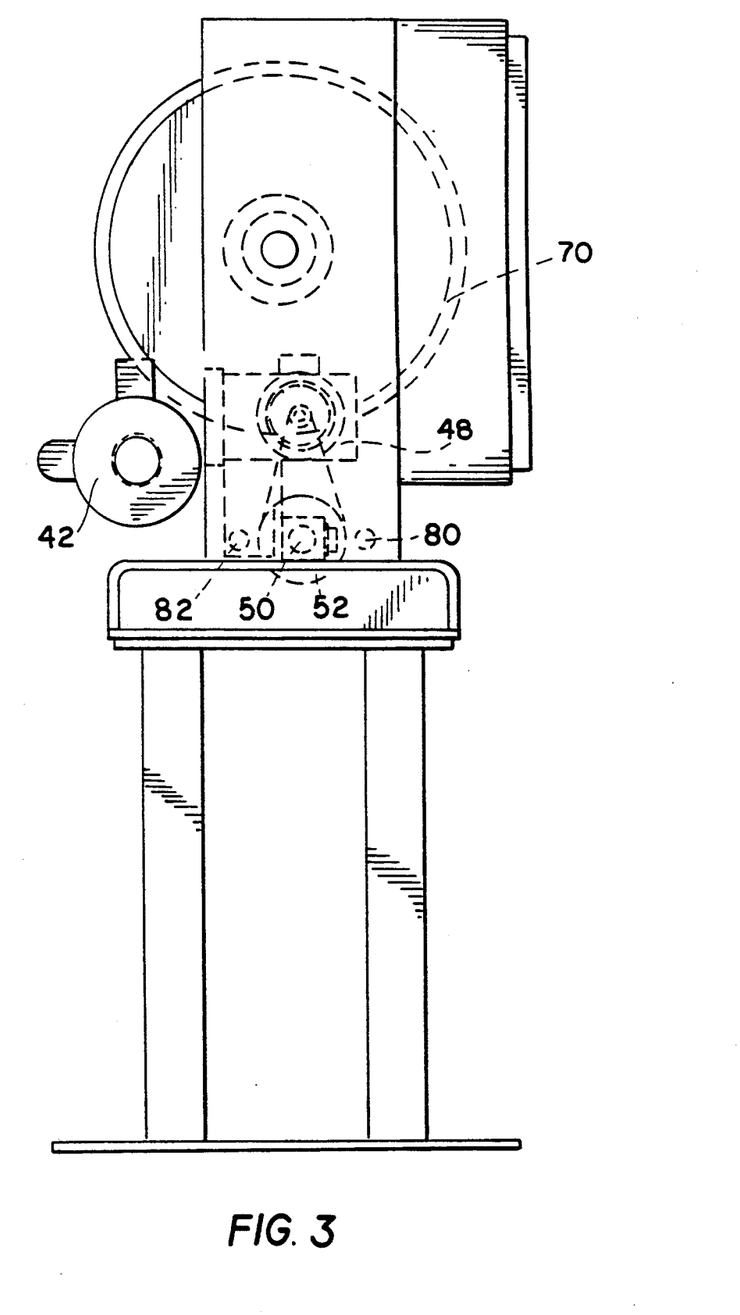
FIG. 3 shows a left side view of the device of FIG. 1.

As shown in FIGS. 1 and 3, secured to frame 18 is a control panel 130. This panel contains an electronic circuit 133 required to drive the motors 42, 48. Also on this panel there are several control and indicating devices, including control buttons 134, 136, a digital keypad 138 and a digital display 140. The control buttons are used for various functions including moving the carriage to the left or the right, starting or stopping the rotation of the mandrel 66, and so on. Importantly the position of the carriage 84 is very precisely set and monitored by digital keypad 138 or alternatively by thumb wheel switches and digital display 140 respectively. The circuitry required to perform these functions may either be discrete analog or digital circuitry, or preferably a digital microprocessor. These types of circuits are readily available off the shelf items.

The core cutting device described above is operated as follows. First the upright member 20 is pivoted sideways and a proper sized mandrel 66 is mounted on shaft 30 and secured to chuck 36 by teeth 62. Next, a tube 70 made of paper, cardboard, or similar material is placed over the mandrel. Previously, axial cuts 74 have been made in tube 70 so that the core can fit over teeth 62 to insure that there is no slippage between the mandrel 66 and the tube 70. Member 20 is pivoted back to its upright position to engage and lock the shaft 30. Frequently the distal end of the tube 70 (i.e. the end near member 20) is damaged or at least uneven so that it is not useful. Therefore before a tube is cut, the carriage 84 is manually positioned to a region in which the tube 70 is undamaged. The mandrel 66 and tube 70 are rotated and a first cut 150 is made in the tube by lowering handle 116. This first cut 150 may be used to serve as a reference point for all future cuts. Next, the axial width (for example 1.00") of a core is set preferably on digital pad 138. The carriage is then automatically positioned to the distance set on key pad 138 from cut 150 by electronic circuit 133. This is accomplished by rotating lead screw 50 with motor 48. As the lead screw turns, its angular position is monitored through encoder 56 and detector 58 by circuit 133. If the detector 58 indicates that a preset position has been overshot, the motor 48 is reversed until the preset position is reached. Of course, if a stepping motor is used, the circuit 133 generates a number of angular steps for the lead screw corresponding to the axial distance set on pad 138 is reached. The position of the carriage is indicated on display 140.

Next, handle 116 is again pivoted downward manually to cut a first core 152. After this core is cut, the above-outlined steps are repeated for the next core. In this manner the whole tube may be cut into cores having the required axial width. The accuracy of each cut is insured by the smooth movement of the carriage. As each cut is made the reaction force from the mandrel passes through the knife and carriage 84 into table 16 thereby insuring that the rods 80, 82 and lead screw 50 are not affected. After a core cutting operation has been completed the whole device may be easily picked up and stored.

Obviously numerous modifications can be made to this invention without departing from its scope as defined in the appended claims.

I claim:

1. A device for separating a tube of cardboard into cores, said device comprising:
   a support;
   a rotatable mandrel including a shaft, said shaft having a first end mounted on said support and a second end;

an upright movable between a first upright position wherein said second end is supported by said upright, and a second position wherein upright is away from said second end;

mandrel rotating means for rotating said mandrel around an axis;

tube mounting means for mounting a tube on said mandrel, wherein said tube is rotated by said mandrel and said mandrel rotating means;

carriage means mounted on said support;

carriage drive means for reciprocating said carriage means along a path parallel to said axis;

blade means mounted on said carriage means and including a blade for cutting said tube, said blade being pivotable on said carriage means between a first blade position in which the blade is away from said tube and a cutting position; and automatic control means for operating said device, said control means being mounted on said frame and including a length selection means for selecting a length of core to be cut from said tube, said control means activating said carriage device means to move said carriage means by an axial distance corresponding to said length, said control means moving said cutting means in an axial distance by measurement and calculation of the position of the carriage means.

2. The device of claim 1 wherein said carriage drive means includes a lead screw extending in parallel with said axis, and lead screw drive means for rotating said lead screw.

3. The device of claim 2 wherein said carriage means includes platform means for supporting said blade means.

4. The device of claim 3 wherein said platform means includes a threaded member engaging said lead screw.

5. A device for cutting cores from a cardboard tube, said device comprising:

a support frame;

a shaft having a first shaft end mounted on said support frame and a second shaft end;

an upright pivotable about a horizontal axis and having shaft holding means for holding said second shaft end;

a mandrel mounted on said shaft;

tube securing means for securing said tube to said mandrel;

rotating means mounted on said support frame for rotating said mandrel and said tube around an axis;

carriage means disposed on said frame;

carriage drive means including a rotatable lead screw for reciprocating said carriage in a path parallel to said axis;

cutting means disposed on said carriage means, said cutting means including a blade and a pivoting arm disposed on said carriage and arranged for manually pivoting said blade radially toward and away from said tube for selectively cutting said tube into cores; and automatic control means for operating said device, said control means being mounted on said frame and including a length selection means for selecting a length of core to be cut from said tube, said control means activating said carriage drive means to move said carriage means by an axial distance corresponding to said length.

6. The device of claim 5 wherein said mandrel is changed by pivoting said upright away from said free end.

7. The device of claim 5 wherein said tube securing means is fixed with respect to said support to prevent axial movement of said tube while said tube is being cut into several cores.

8. The device of claim 5 wherein said carriage drive means includes a drive motor mounted on said frame, and coupling means coupling said motor to said carriage means.

9. The device of claim 8 wherein said lead screw is coupled for rotation to said drive motor and wherein a threaded member is mounted on said carriage means for engaging said lead screw.

10. The device of claim 5 wherein said carriage means includes a platform for supporting a blade, and a plurality of wheels supporting said platform on said frame.

11. The device of claim 10 wherein said drive means further comprises at least one rod extending in parallel with said lead screw for guiding said carriage.

* * * * *